United States Patent [19]

Ziegler

[11] Patent Number: 4,799,315
[45] Date of Patent: Jan. 24, 1989

[54] KNIFE SUPPORT AND CUTTING GUIDE

[76] Inventor: Steven M. Ziegler, 5252 Wethersfield Rd., Jamesville, N.Y. 13078

[21] Appl. No.: 59,752

[22] Filed: Jun. 8, 1987

[51] Int. Cl.[4] .............................................. B26B 3/00
[52] U.S. Cl. ....................................... 30/293; 30/310; 30/329; 33/42
[58] Field of Search .................. 30/164.9, 164.95, 289, 30/290, 293, 300, 310, 329; 33/27.03, 42, 41.1, 41.6; 144/24

[56] References Cited

U.S. PATENT DOCUMENTS 1,595,993  9/1926  Vlazny ..................................... 33/42
3,922,784  12/1975  Prince et al. ...................... 30/329 X

*Primary Examiner*—Douglas D. Watts
*Attorney, Agent, or Firm*—Charles S. McGuire

[57] ABSTRACT

A standard cutting tool of the type commonly used to cut paperboard as a border for framing pictures or other objects is held in a two-piece clamp on the end of a curved arm. A first circular member on the other end of the arm has a surface which mates with a similar surface on a second circular member on the end of an elongated rod. The two circular members are placed in a desired rotational orientation and releasably held therein by a screw or other retaining means. One of two interchangeable, surface engaging, guide members is releasably retained at a desired position along the length of the rod, permitting the cutting tool to make either a circular or a straight cut in the paperboard with a beveled edge. The rotational adjustment of the two circular members permits the longitudinal axis of the blade to be aligned with the direction of blade movement when making circular cuts, thereby eliminating blade drag due to misalignment.

8 Claims, 1 Drawing Sheet

KNIFE SUPPORT AND CUTTING GUIDE

BACKGROUND OF THE INVENTION

The present invention relates to guides for knives used in the cutting of paperboard and similar materials, and more specifically to guides for selectively making either a circular or a straight cut with a beveled edge of desired angle relative to the surface of the material.

In the mounting and framing of pictures or other articles, it is common practice to provide a border of one or more layers of relatively thick paperboard, or a similar material, often having a colored surface and an interior which is white or of another shade differing from the surface color. The size and shape of the cut-out area depends upon the nature of the object to be bordered thereby, but in the majority of cases, the edge(s) of both the outer periphery and the cut-out portion are either straight, forming, e.g., a square or rectangular area, or circle.

A cutting tool commonly used in preparing paperboard matting or framing materials is known as a mat knife, comprising a hollow handle of two pieces, releasably attached by one or more screws and holding a separate, metal blade. While it is normally a simple matter to cut straight edges by drawing the knife blade along a linear member placed on the surface of the paperboard, circular cuts present a different problem. Templates of circular or other form are commonly used, but of course are fixed in size which limits the size and shape of the cut to the templates available at a given time.

It is also usually desired that the cut-out area, and sometimes the outer periphery, of the paperboard be cut with a beveled edge. That is, decorative effects may be achieved by exposing, by way of a tapered or beveled edge, the interior of the paperboard material which is commonly of a color contrasting with or complementing the surface color. It is often difficult to control the angle of the bevel, and thus to provide a neat and uniform cut around an entire border or cut-out area by manual manipulation of a mat knife, particularly when making circular or other non-linear cuts.

It is a principal of the present invention to provide a cutting guide adaptable to permit either linear or circular cuts with a beveled edge in paperboard, or similar materials, with a conventional mat knife.

Another important object is to provide apparatus for holding and guiding a standard mat knife to make either circular or linear cuts in paperboard with a controlled and uniform bevel on the cut edges.

Still another object is to provide a cutting implement holder and guide which permits circular beveled edges to be cut in paperboard matting or framing materials with a standard mat knife with selective control of the position of the blade relative to the direction of cutting to effectively eliminate blade drag due to misalignment of the blade with the cutting direction.

Other objects will in part be obvious and will in part appear hereinafter.

SUMMARY OF THE INVENTION

In accordance with the foregoing objects, the invention contemplates a knife holder and cutting guide having a clamp configured to grasp the handle of a conventional mat knife firmly in a position for lowering the cutting edge and tip of the blade into engagement with an underlying paperboard layer. One side of the clamp is affixed to one end of a curved arm, a first circular member being fixedly attached at its outer periphery to the other end of the arm. A second circular member is likewise fixedly attached to one end of an elongated rod which may be provided in two or more sections releasably attached end-to-end.

A surface-engaging member is slidably positioned on the rod and means are provided for releasably holding the member in a desired position along the length of the rod. The surface-engaging member is preferably provided in two embodiments, one having a pin projecting downwardly therefrom and the other having a planar member with a flat surface and linear lower edge perpendicular to the axis of the rod when mounted thereon. The knife-holding clamp is assembled with the rod by placing opposing surfaces of the two circular members in contact in a desired rotational orientation and releasably securing them together with a screw. The opposing surfaces are preferably formed with mutual engagement portions to inhibit relative rotation when the members are secured together.

Accurate and uniform circular cuts may be made by placing the pin of the first surface-engaging member in piercing engagement with the paperboard and moving the knife in the circular pattern in which it is thus constrained. A straight cut may be made by placing the linear surface-engagement member on the rod and drawing the flat surface or linear edge thereof along any convenient, straight edge such as the side of a table, straight edge on a drawing board, etc. The knife blade is so oriented, by virtue of the relative arrangement of the clamp, curved arm and rod, that it passes through the paperboard at an oblique angle to the surface, thereby providing a beveled edge where the board is cut. The relative rotational position of the two circular members may be altered to provide beveled edged, circular cuts of different diameter while maintaining alignment of the blade with the direction of the cut.

DETAILED DESCRIPTION

Figure 1:
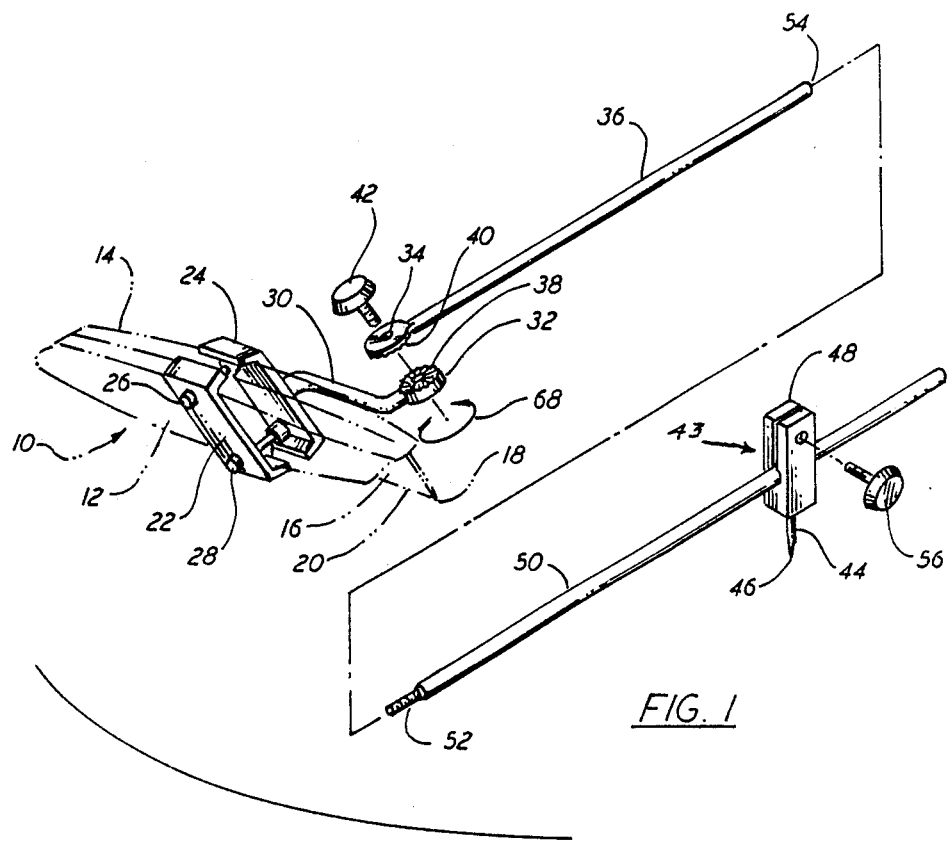
FIG. 1 is an exploded, perspective view of the knife holder and cutting guide of the invention, with a conventional mat knife shown in phantom lines.

Referring now to the drawing, in FIG. 1 there is shown in phantom lines a standard cutting implement, commonly known as a mat knife and generally designated by reference numeral 10. Knife 10 includes a hollow handle formed of two complementary halves 12 and 14 held in engagement by a pair of screws (not shown). A separate blade 16 having a pointed tip 18 and cutting edge 20 is removably secured between the handle pieces.

The tool of the present invention includes means constructed and arranged to support knife 10 in a firmly held position as it is moved to cut an underlying material. The knife support means is in the form of a clamp having two pieces 22 and 24, secured to one another by screws 26 and 28, with knife 10 held firmly therebetween. Clamp piece 24 is fixedly attached to one end of curved arm 30, and first circular member 32 is fixedly attached on its outer periphery to the other end of the arm. Second circular member 34 is fixedly attached at its outer periphery to one end of elongated rod 36. Clamp piece 24 is assembled with support rod 36 by placing surfaces 38 and 40 of circular members 32 and 34, respectively, in opposing engagement and threading screw 42 through tapped, central openings in the two members. Radial notches or grooves in surfaces 38 and 40 are in mutual engagement to insure that circular members 32 and 34 do not rotate relative to one another once they are secured together by screw 42.

A first surface-engagement member, generally denoted by reference numeral 43, includes pin 44, having sharp end portion 46, extending from split block 48. An opening is provided through block 48 for sliding passage of elongated rod 50 or rod 36, depending on the desired distance from the surface-engaging member to the blade. Rod 50 provides an extension for rod 36, when required, having externally threaded end 52 for engagement with internally threaded end 54 of rod 36. Screw 56 is threaded into openings provided in split block 48 to cause the latter to frictionally engage rod 50 or rod 36, thereby releasably fixing the position of the surface-engaging member at a desired position along the length of the rod, and thus at a desired distance from the blade.

Figure 2:
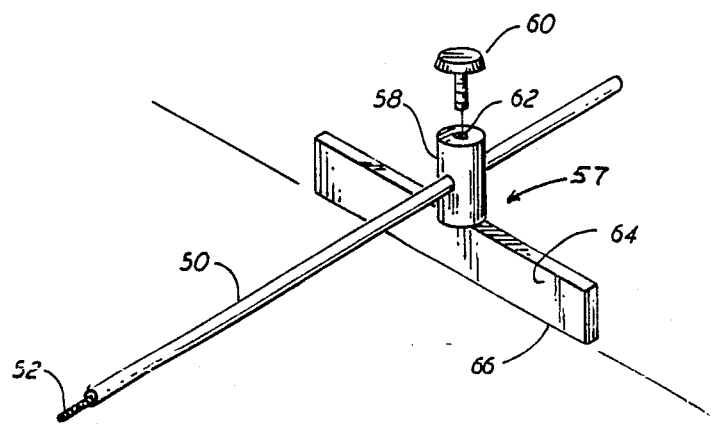
FIG. 2 is a fragmentary, perspective view showing a portion of the tool with a second embodiment of a portion thereof.

A second embodiment of surface-engaging member, generally denoted by reference numeral 57, is shown in FIG. 2. Rod 50 (or 36) may be slidingly passed through an opening in block 58 and releasably fixed in a desired relative position by set screw 60 which is threaded into tapped opening 62 to frictionally engage rod 50. Fixedly attached to block 58 is a member having flat surface 64 and linear lower edge 66, both of which are arranged perpendicular to the axis of rod 50 when the latter is engaged in the opening provided therefor in block 58.

The curvature of arm 30 provides an offset of the position of clamp pieces 22 and 24 from the axis of rod 36. This offset, together with the angular orientation of the fixed connection of clamp piece 24 to arm 30, places the plane of blade 16 at a predetermined angle, e.g., 45°, to the horizontal plane in which the surface of the paperboard is arranged when rod 36 (and rod 50, when used) is parallel to the surface of the paperboard. This permits the angle of the beveled edge which is cut in the paperboard to serve as the border for the object being framed or mounted to be selectively controlled within limits established by the fixed relative orientation of the tool parts and the knife.

A further feature of the invention involves the adjustment of the longitudinal axis of the blade, i.e., cutting edge 20, with respect to the axis of support rods 36 and 50. Since cutting is performed by the portion of edge 20 adjacent tip 18, which engages the material at a position offset from the vertical plane passing through the support rods, the cutting portion of the blade does not remain in alignment with the direction of cutting as the radius is changed. In order to avoid blade drag, the cutting edge must be aligned with the direction of the cut. Thus, when making circular cuts, cutting edge 20 should be tangent to the periphery of the circle. This requires adjustment of the blade axis relative to the support rod axis as the radius of the circular cut, i.e., the distance from point 46 to blade tip 18, is changed. Such adjustment may be effected by loosening screw 42, rotating arm 30 relative to rod 36 until knife 10 is in the proper position, and retightening screw 42. Visual alignment is usually satisfactory, after basic familiarity with the tool, but indicia may be placed, for example, on the peripheries of circular members 32 and 34 to indicate the proper relative positions thereof when cutting circles of various radii. The angle of the blade surface relative to the material being cut which provides the controlled bevel of the cut edge, of course, remains the same as the angle of the blade axis is adjusted.

From the foregoing, it is apparent that the knife support and cutting guide of the invention may be utilized to provide circular cuts having a radius equal to the selectively controlled distance between point 46 of surface-engaging member 43 and blade tip 18. Also, the cut will be made leaving a beveled edge at a predetermined angle which is uniform throughout the length of the cut. Likewise, a straight cut may be made, with the same uniform, controlled angle on the beveled edge, by placing the alternate surface-engaging member 57 on rod 50 (or 36) and drawing flat surface 64 and/or linear edge 66 along any convenient straight surface or edge at the desired distance from blade tip 18. Rods 36 and 50 may, of course, be provided as a single rod or in any desired number of detachably connected rods.

What is claimed is:

1. A knife support and guide adapted to hold a conventional mat knife having a handle and essentially flat blade of predetermined dimensions, said support and guide comprising:
    (a) clamp means adapted to releasably engage and hold said knife handle in a fixed, predetermined orientation relative to said clamp means;
    (b) an arm fixedly attached to said clamp means and having an axis lying in a first plane;
    (c) an elongated rod having a linear axis lying in a second, vertical plane;
    (d) means for releasably attaching said arm to said rod in adjustable angular orientations of said first and second planes, including first and second circular members fixedly attached to end portions of said arm and said rod, respectively, and means for releasably holding said circular members in superposed, contacting relation in an adjustable rotational orientation; and
    (e) a surface-engaging member engageable with said rod and including means for releasably fixing the position of said member at any desired position along the length of said rod.

2. The invention according to claim 1 wherein said surface-engaging member includes a portion having a flat surface and linear edge, each perpendicular to said linear axis for movement along a flat surface to guide said knife in making a linear cut.

3. The invention according to claim 1 wherein said surface-engaging member includes a pin having a sharp end portion for engagement with an underlying surface for moving said knife to make a circular cut having a radius equal to the distance between said pin end portion and the cutting portion of said knife blade.

4. The invention according to claim 1 wherein the relative orientation of said surface-engaging member, said rod, said arm and said clamp means is such, when said linear axis is substantially horizontal, that the plane of said knife blade is disposed at a predetermined angle relative to a vertical plane.

5. The invention according to claim 4 wherein said predetermined angle is between about 30° and 60°.

6. The invention according to claim 4 wherein the orientation of said blade relative to the direction of movement of the cutting portion of said blade in making said circular cut is changed by changing said adjustable relative orientations of said first and second planes, whereby blade drag may be essentially eliminated by aligning said cutting portion with said direction of movement.

7. The invention according to claim 6 wherein said circular members each include a central opening and said means for releasably holding said members comprises a screw extending through said openings and threaded into a tapped opening in at least one of said members.

8. The invention according to claim 7 and further including engagement means on the opposing surfaces of said circular members for preventing relative rotational movement thereof when said members are held in contacting relation by said screw

* * * * *